US 10,468,934 B2

(12) United States Patent
Nogami et al.

(10) Patent No.: US 10,468,934 B2
(45) Date of Patent: Nov. 5, 2019

(54) ELECTRIC MACHINE

(71) Applicant: Nidec Corporation, Kyoto (JP)

(72) Inventors: Sakae Nogami, Kyoto (JP); Junya Matsuyama, Kyoto (JP); Shinnosuke Gokan, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 343 days.

(21) Appl. No.: 15/643,599

(22) Filed: Jul. 7, 2017

(65) Prior Publication Data

US 2018/0034342 A1 Feb. 1, 2018

(30) Foreign Application Priority Data

Jul. 26, 2016 (JP) .................... 2016-146315

(51) Int. Cl.
*H02K 5/10* (2006.01)
*H02K 11/33* (2016.01)
*H02K 5/22* (2006.01)
*H02K 11/30* (2016.01)

(52) U.S. Cl.
CPC ............... *H02K 5/10* (2013.01); *H02K 5/22* (2013.01); *H02K 11/30* (2016.01); *H02K 11/33* (2016.01)

(58) Field of Classification Search
CPC .......... H02K 5/10; H02K 11/30; H02K 11/33; H02K 5/22
See application file for complete search history.

(56) References Cited

U.S. PATENT DOCUMENTS

| 4,593,163 A * | 6/1986 | Fisher .................... H01H 1/26 |
| | | 200/80 R |
| 5,663,603 A * | 9/1997 | Sakashita ........... G11B 19/2009 |
| | | 310/67 R |
| 9,807,894 B2 | 10/2017 | Yu et al. |
| 2013/0294949 A1* | 11/2013 | Blaser ................. F04D 15/0218 |
| | | 417/410.1 |

FOREIGN PATENT DOCUMENTS

| CN | 202127561 U | 1/2012 |
| JP | 62-278542 A | 12/1987 |
| JP | 04-85786 U | 7/1992 |
| JP | 2005-86116 A | 3/2005 |
| JP | 2013-69780 A | 4/2013 |

* cited by examiner

*Primary Examiner* — Mohamad A Musleh
(74) *Attorney, Agent, or Firm* — Keating & Bennett, LLP

(57) ABSTRACT

An electric machine with a casing includes a circuit board arranged inside the casing and on which an electronic component is mounted, and a sealing member covering the circuit board. The sealing member includes, at a part of a boundary surface thereof coming into contact with air, a first inclined surface inclined downwardly in a vertical direction. The casing includes a front wall covering a side of the sealing member on a downward side of the first inclined surface, a rear wall covering a side of the sealing member on an upward side of the first inclined surface, and a pair of side walls covering sides of the sealing member in a direction perpendicular to a direction in which the first inclined surface is inclined. The front wall has a groove concaved from an upper side to a lower side, and the first inclined surface is inclined toward the groove.

16 Claims, 7 Drawing Sheets

ELECTRIC MACHINE

CROSS REFERENCE TO RELATED APPLICATIONS

This application claims the benefit of priority to Japanese Patent Application No. 2016-146315 filed on Jul. 26, 2016. The entire contents of this application are hereby incorporated herein by reference.

BACKGROUND OF THE INVENTION

1. Field of the Invention

The present invention relates to an electric machine.

2. Description of the Related Art

Heretofore, a water waterproofing function is desired in various electric machines that are installed in equipment used outside, such as a communication base station for mobile telephones, wireless LANs, etc. As an example of a waterproofing method, a method for resin sealing a circuit board is described in the specification of Japanese Laid-open Patent Application Publication No. 2005-086116.

Disclosed in a power unit described in the specification of Japanese Laid-open Patent Application Publication No. 2005-086116 is a resin sealing member, in which a surface thereof is inclined upwardly on one side of the internal case and downwardly on the other side of the case, aiming at decreasing resin usage.

However, in an electric machine such as the power unit described in Japanese Laid-open Patent Application Publication No. 2005-086116, when the water entered from the outside remains inside of the machine for a long period of time, there is a possibility that the resin sealing member is eroded, and there is even a possibility that aging degradation of the machine is accelerated, and thus, it can be said that the waterproofing function has been inadequate.

SUMMARY OF THE INVENTION

According to an exemplary first embodiment of the invention, an electric machine with a casing includes a circuit board arranged inside the casing and on which an electronic component is mounted, and a sealing member that covers the circuit board. The sealing member includes, at least at a part of a boundary surface thereof coming into contact with air, a first inclined surface inclined downwardly in a vertical direction. The casing includes a front wall that covers a side of the sealing member on a downward side of the first inclined surface of the boundary surface, a rear wall that covers a side of the sealing member on an upward side of the first inclined surface of the boundary surface, and a pair of side walls that cover sides of the sealing member in a direction perpendicular to a direction in which the first inclined surface of the boundary surface is inclined. The front wall has a groove concaved from an upper side to a lower side in the vertical direction. The first inclined surface is inclined toward the groove.

According to the first embodiment of the invention, an electric machine in which the waterproofing function has been enhanced can be provided.

The above and other elements, features, steps, characteristics, and advantages of the present invention will become more apparent from the following detailed description of the preferred embodiments with attached drawings.

DETAILED DESCRIPTION OF THE PREFERRED EMBODIMENTS

Figure 1:
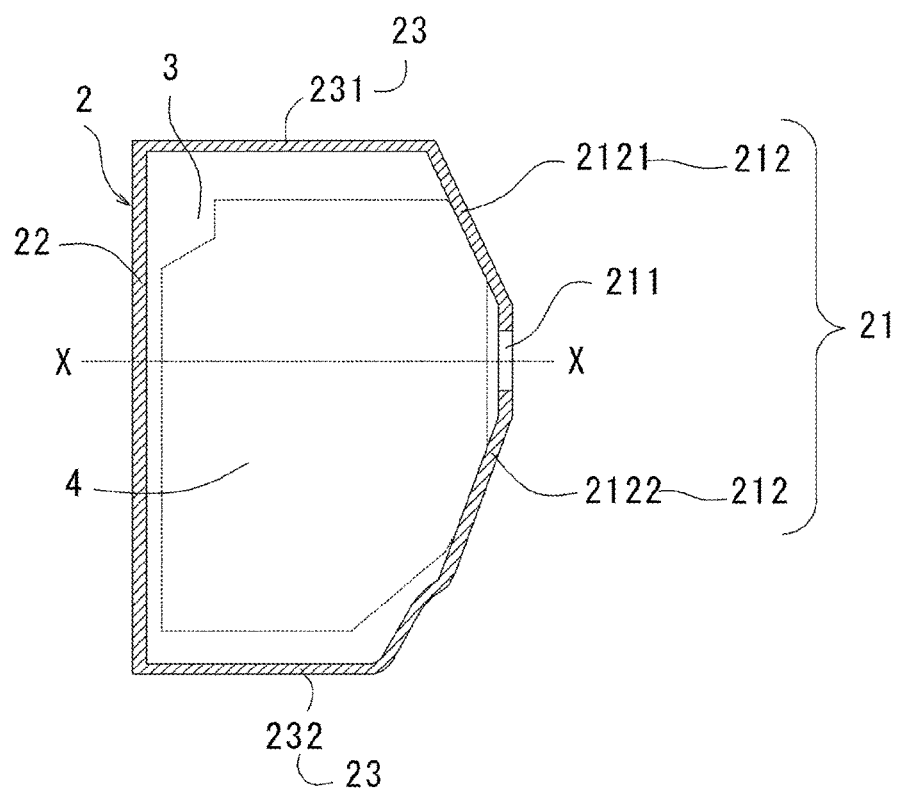
FIG. 1 is a partial top diagram of an electric machine according an exemplary embodiment of the invention.

Hereinafter, exemplary embodiments of the invention will be described referring to the drawings. In the following description, the direction of gravitational force will be described as "vertical direction".

Figure 2:
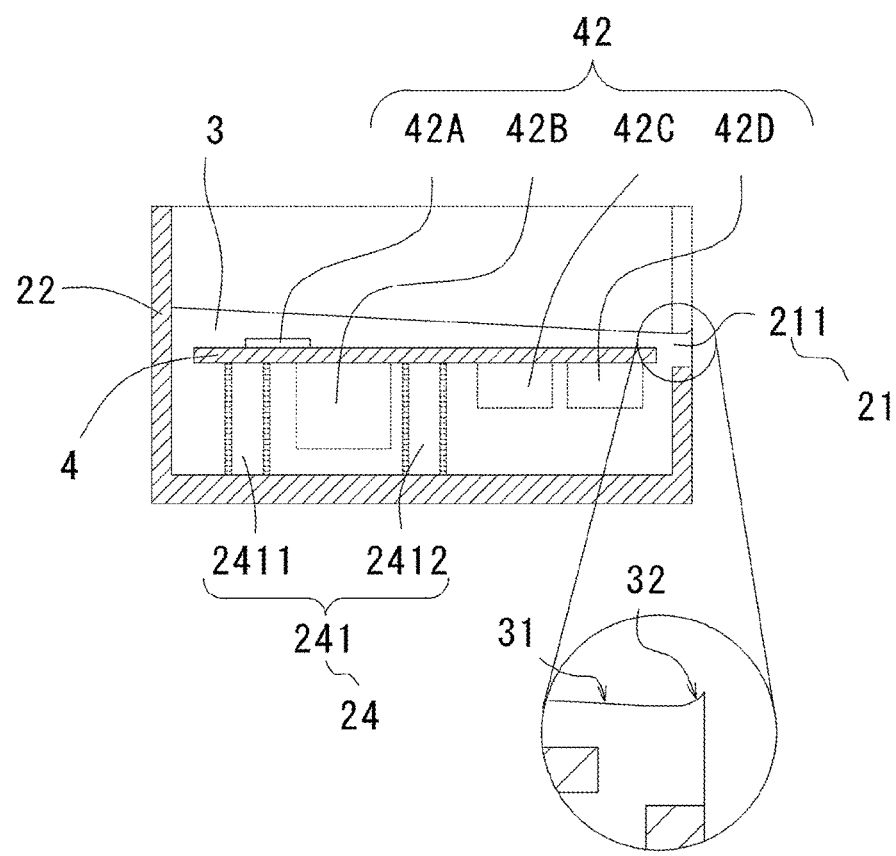
FIG. 2 is a partial cross-section diagram of the electric machine according to the exemplary embodiment of the invention.
Figure 3:
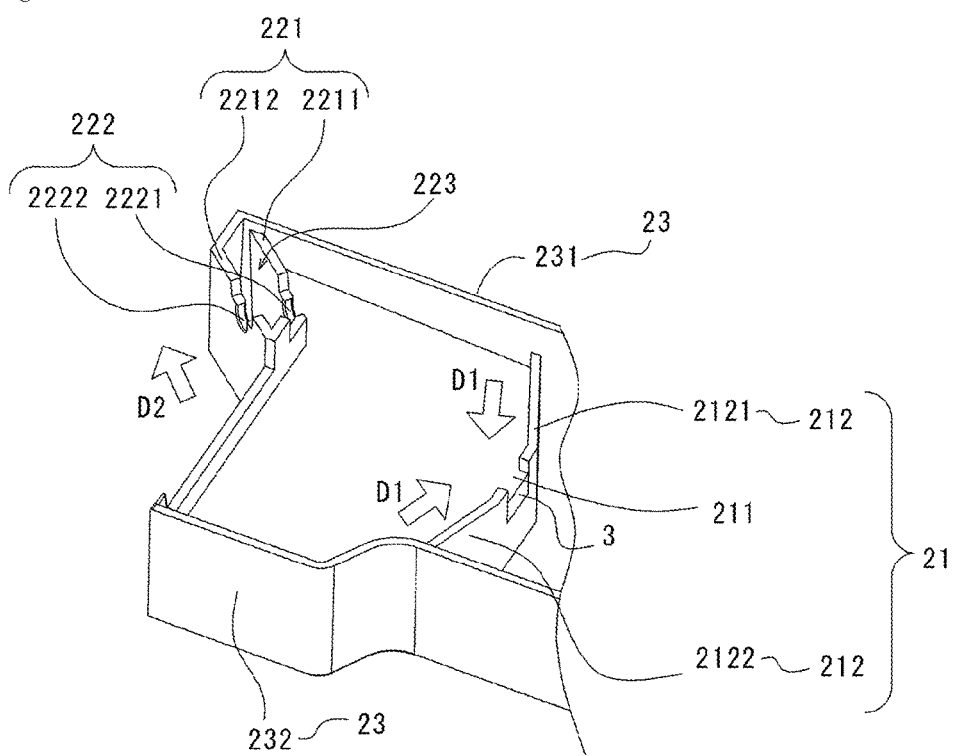
FIG. 3 is a partial perspective diagram of the electric machine according to the exemplary embodiment of the invention.

FIG. 1 is a partial top diagram of an electric machine 1 according to an exemplary embodiment of the invention. FIG. 2 is a partial cross-section diagram at a dashed line X-X of FIG. 1. FIG. 3 is a partial perspective diagram of the electric machine 1 according to the exemplary embodiment of the invention.

As shown in FIG. 1, the electric machine 1 according to the exemplary embodiment of the invention includes a casing 2, a circuit board 4 arranged inside the casing 2 and on which an electronic component 42 to be described hereinafter is mounted, and a sealing member 3 that covers the circuit board 4. The casing 2 has a front wall 21 that covers a side of the sealing member 3 on the downward side of a first inclined surface 31, which will be described later, of a boundary surface of the sealing member 3, coming into contact with air, a rear wall 22 that covers a side of the sealing member 3 on the upward side of the first inclined surface 31, and a pair of side walls 23 (231, 232) that cover sides of the sealing member 3 in a direction perpendicular to a direction in which the first inclined surface 31 of the boundary surface is inclined. The front wall 21 has a groove 211 concaved from the upper side to the lower side in the vertical direction, and the first inclined surface 31 is inclined toward the groove 211.

As shown in FIG. 2, the sealing member 3 has, at least at a part of the boundary surface coming into contact with air, the first inclined surface 31 that is inclined downwardly in the vertical direction, and at a part of the boundary surface on the side of the front wall 21 more than the first inclined surface 31, a second inclined surface 32 that is inclined upwardly in the vertical direction. Thereby, as indicated by arrows D1 in FIG. 3, water intruded from the outside into the casing 2 streams down the first inclined surface 31 and the second inclined surface 32, and is discharged from the groove 211 of the front wall 21. Therefore, it will never occur that water remains inside the casing 2 for a long period of time, and thus, the waterproofing function by the sealing member 3 can be maintained, and the product reliability is increased.

The second inclined surface 32 is a minute inclined surface that is formed in the course of molding the sealing member 3. The molding process of the sealing member 3 includes at least the following three processes. First, a masking tape is attached to the front wall 21 so as to cover the groove 211. Thereby, the groove 211 is sealed by the masking tape. Next, in a state that the casing 2 is inclined such that the inclination angle of the first inclined surface 31 is at a predetermined inclination angle, a potting material is poured into the casing 2 to the extent that at least the connection portion of a lead wire 5 to be described later and the circuit board 4 is covered by the potting material. Then, the potting material is hardened, and thereby the sealing member 3 is formed. Lastly, the masking tape is peeled off. The second inclined surface 32 is a portion that is formed, in the course of molding process as described above, by being raised in a minute scale, in accordance with the magnitude of the surface tension of the potting material relative to the masking tape. The second inclined surface 32 may not be formed, by appropriately selecting the kind of the potting material, the molding method, etc.

Returning to FIG. 1, the casing 2 has a circuit board accommodating part accommodating the circuit board 4, surrounded by the front wall 21, the rear wall 22, and the pair of side walls 23. The circuit board 4 is covered by the sealing member 3 in the circuit board accommodating part. The pair of side walls 23 (231, 232) extend in parallel to each other. The pair of side walls 23 (231, 232) may extend such that the distance between the pair of side walls 23 (231, 232) become narrower toward the front wall 21. The front wall 21 includes a guide wall 212 directed from at least one side wall 23 of the pair of side walls 23 (231, 232) to the groove 211. In FIG. 1, the front wall 21 includes guide walls 2121, 2122 directed from both side walls 23 of the pair of side walls 23 (231, 232) to the groove 211. Thereby, the water intruded from the outside into the circuit board accommodating part is guided by the first inclined surface 31 toward the guide walls 2121, 2122. The water is then directed to the groove 211, following the guide walls 2121, 2122, and is discharged further efficiently.

Figure 5:
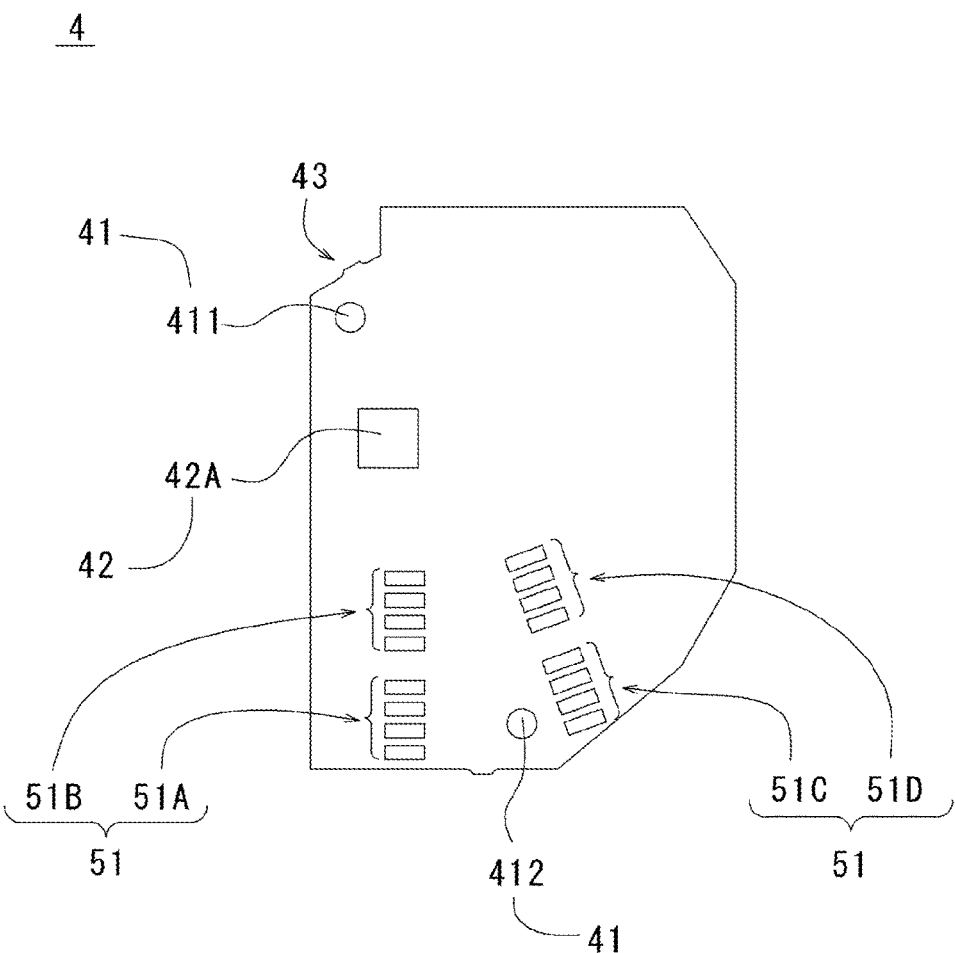
FIG. 5 is a top diagram of a circuit board according to the exemplary embodiment of the invention.
Figure 6:
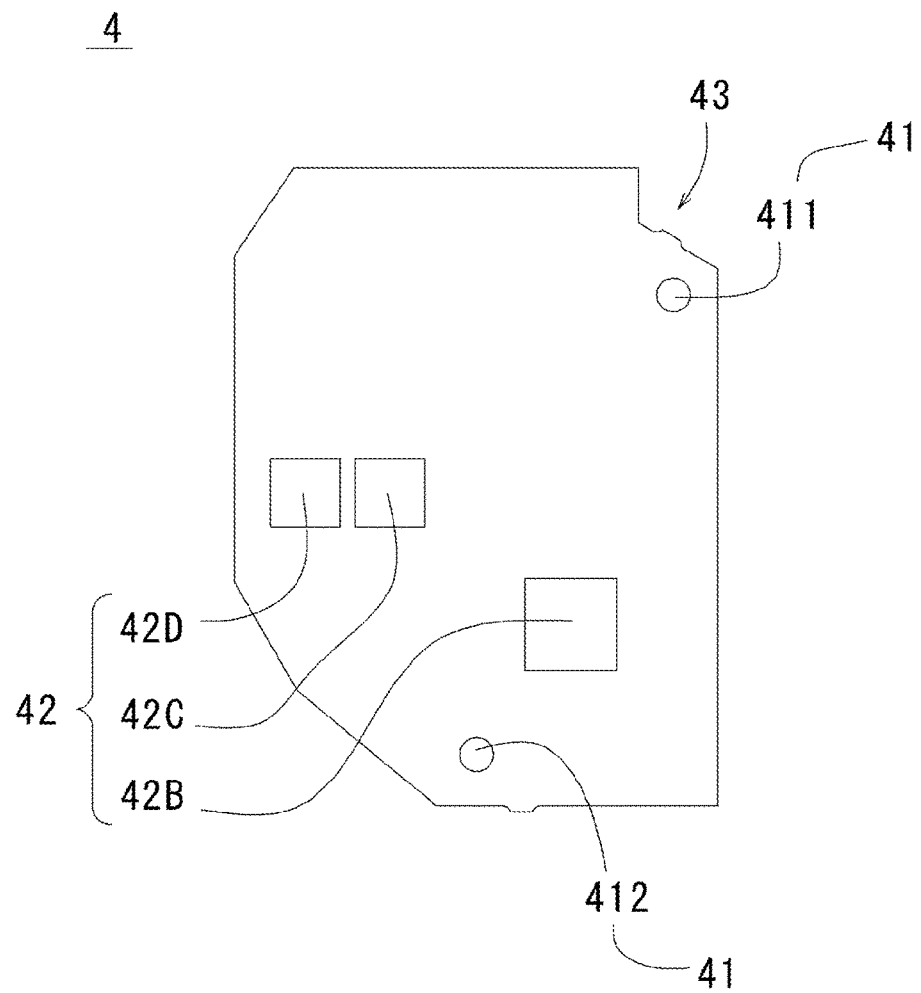
FIG. 6 is a bottom diagram of the circuit board according to the exemplary embodiment of the invention.

Next, description is made with respect to the circuit board 4 located inside the casing 2, referring to FIG. 2, FIG. 5, and FIG. 6. FIG. 2 is a partial cross-section diagram of the electric machine 1 according to the exemplary embodiment of the invention. FIG. 5 is a top diagram of the circuit board 4 according to the exemplary embodiment of the invention. FIG. 6 is a bottom diagram of the circuit board 4 according to the exemplary embodiment of the invention.

As shown in FIG. 2, the casing 2 includes a bottom surface portion 24 covering the lower side of the circuit board 4 in the vertical direction. The bottom surface portion 24 includes a plurality of cylindrical parts 241 (2411, 2412) extending upward in the vertical direction. As shown in FIG. 5 and FIG. 6, the circuit board 4 includes a plurality of through-holes 41 (411, 412) penetrating through the circuit board 4 in the vertical direction. The cylindrical parts 241 (2411, 2412) extend, coaxially with the through-holes 41 (411, 412), in the vertical direction. That is, the cylindrical part 2411 and the through-hole 411, and the cylindrical part 2412 and the through-hole 412, coaxially extend, respectively.

The circuit board 4 is fixed to the bottom surface portion 24 of the casing 2 by causing the under surface of the circuit board 4 to contact the upper parts of the cylindrical parts 241 (2411, 2412) and thereafter inserting not-shown screws into the through-holes 41 (411, 412). It is preferable to set the height of the cylindrical parts 241 (2411, 2412) relatively high in the vertical direction. When the height of the cylindrical parts 241 (2411, 2412) is relatively low in the vertical direction, the distance from the open side of the casing 2 (the upper side in FIG. 2) to the upper parts of the cylindrical parts 241 (2411, 2422) becomes relatively long. Therefore, the distance that the circuit board 4 is inserted toward the bottom surface portion 24 of the casing 2 becomes relatively long, and thus, the operability in attaching the circuit board 4 to the casing 2 is deteriorated. By making the height of the cylindrical parts 241 (2411, 2412) relatively high in the vertical direction, the distance from the open side of the casing 2 to the cylindrical parts 241 (2411, 2412) becomes relatively short, and thereby the operability in attaching the circuit board 4 to the casing 2 can be improved. In other words, it is preferable to secure a relatively large space between the circuit board 4 and the bottom surface portion 24. Specifically, the height of the cylindrical parts 241 (2411, 2412) in the vertical direction is preferably ¼ or greater and smaller than ¾ of the height of the casing 2 in the vertical direction.

On the other hand, in recent years there exists a market need for the electric machine 1 to be light, thin, short, and small. Therefore, as the electric machine 1 becomes thinner, the casing 2 of the electric machine 1 must be also made thinner. In other words, while securing the above-described space to be relatively large, the need for making the electric machine 1 thinner must be met. Therefore, the arrangement of electronic components 42A, 42B, 42C, and 42D in various sizes must be devised.

In the present embodiment, as shown in FIG. 2 and FIG. 5, on the top surface of the circuit board 4, the electronic component 42A that is thinner than the circuit board 4 in the vertical direction is mounted. Thereby, the thickness of the sealing member 3 in the vertical direction can be made thinner, above the circuit board 4, and thus, the electric machine 1 can be made thinner. Also, by making the height of the cylindrical parts 241 (2411, 2412) relatively high, a relatively large space can be provided below the circuit board 4. As shown in FIG. 2 and FIG. 6, in order to utilize the above-described space below the circuit board 4, the electronic components 42B, 42C, and 42D that are thicker than the circuit board 4 in the vertical direction are mounted to the under surface of the circuit board 4. Thus, while the operability in attaching the circuit board 4 to the casing 2 is improved, the market need for making the electric machine 1 thinner can be also met.

As shown in FIG. 2, the thickness of the sealing member 3 in the vertical direction above the circuit board 4 is larger on the side of the rear wall 22 than on the side of the front wall 21. Further, the electronic component 42A that is relatively thick among the electronic components that are thinner than the circuit board 4 is mounted on a part of the top surface of the circuit board 4 on the side of the rear wall 22 where the sealing member 3 is thicker in the vertical direction. Thereby, the thickness of the sealing member 3 in the vertical direction above the circuit board 4 can be kept to the minimum necessary. Thus, the usage of the potting material of the sealing member 3 can be kept to the minimum necessary, and thereby the electric machine 1 that is low in cost can be provided.

Figure 4:
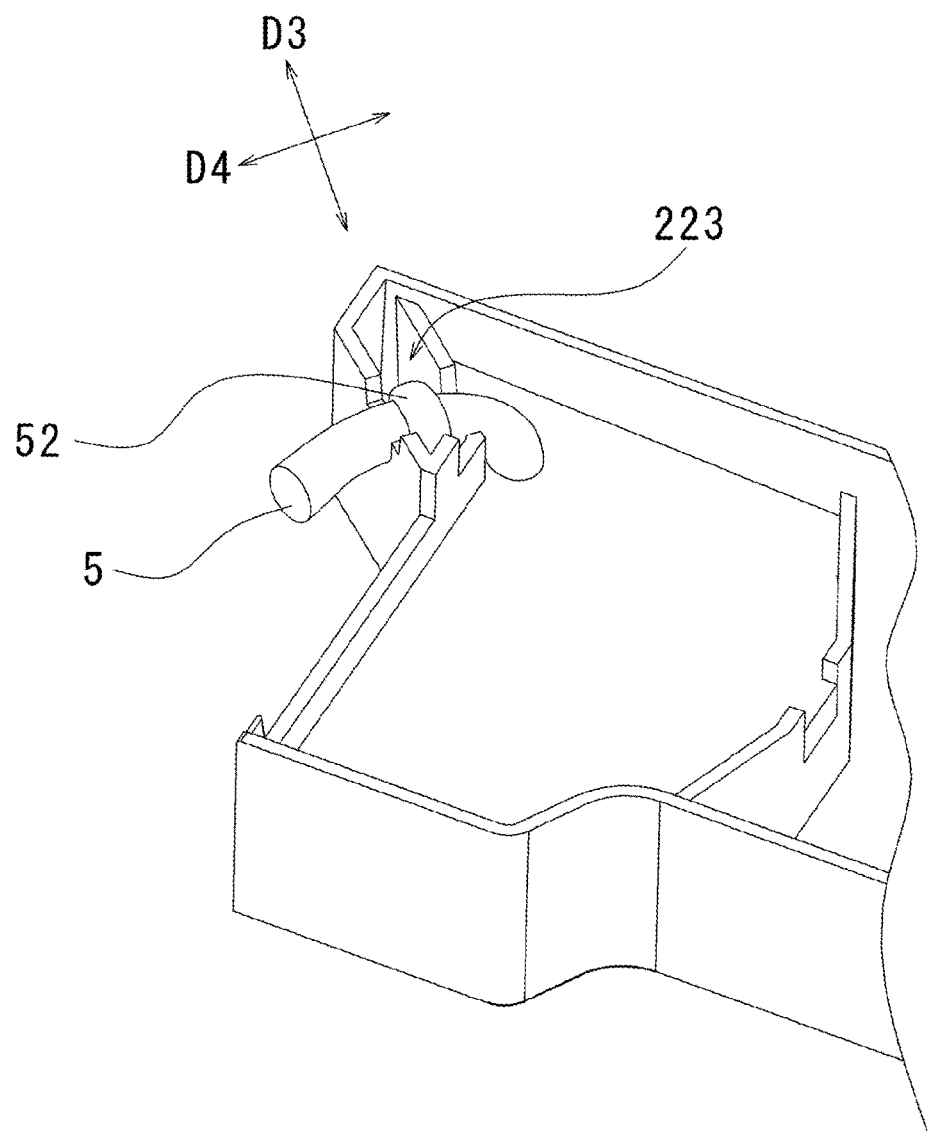
FIG. 4 is another partial perspective diagram of the electric machine according to the exemplary embodiment of the invention.
Figure 7:
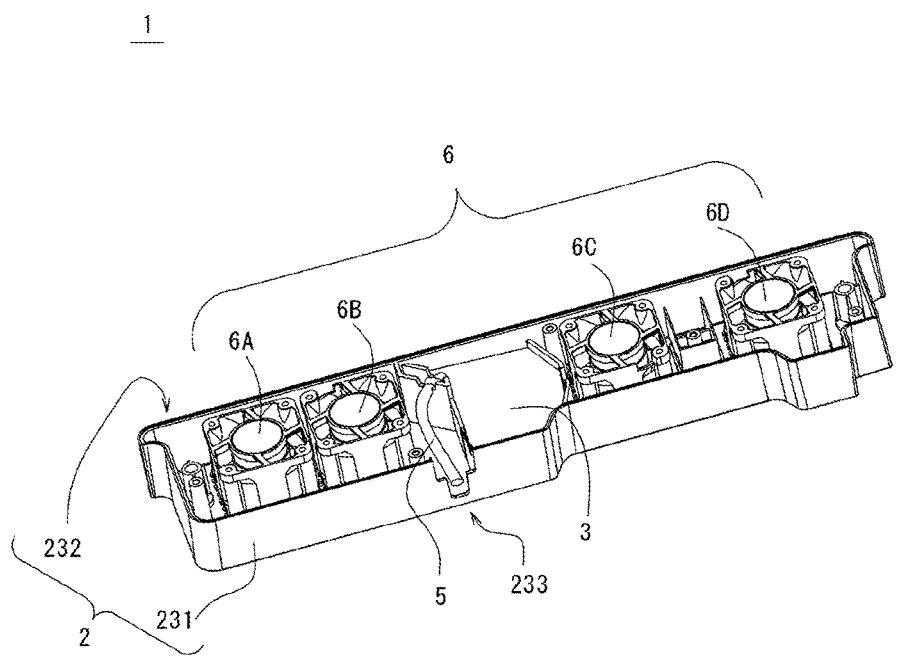
FIG. 7 is a perspective diagram of the electric machine according to the exemplary embodiment of the invention.

Subsequently, referring to FIG. 3, FIG. 4, FIG. 5, and FIG. 7, description is made with respect to the drawing-out structure of the lead wire 5. FIG. 3 and FIG. 4 are partial perspective diagrams of the electric machine 1 according to the exemplary embodiment of the invention. FIG. 4 is the same as FIG. 3 except showing the lead wire 5. FIG. 5 is a top diagram of the circuit board 4 according to the exemplary embodiment of the invention. FIG. 7 is a perspective diagram of the electric machine 1 according to the exemplary embodiment of the invention.

As shown in FIG. 7, the lead wire 5 drawn out from the circuit board 4 is drawn out to the outside of the casing 2 for electrical connection with another electric machine. The lead wire 5 is formed of plural wire groups not shown. The plural wire groups not shown are put together into one bundle, using a tube, etc. with high tolerance against noise such as electromagnetic waves, etc. In the present embodiment, the lead wire 5 includes six wire groups not shown. The six wire groups not shown are connected to the under surface of the circuit board 4. In other words, the lead wire 5 is pressed by the circuit board 4 downwardly in the vertical direction. Thereby, it is suppressed that the lead wire 5 is bent upwardly in the vertical direction. Further, as shown in FIG. 5 and FIG. 6, the circuit board 4 has a cut-out portion 43 formed by cutting out a region adjacent to a plurality of support walls 221 (2211, 2212) described later. The lead wire 5 is drawn out from the circuit board 4 through the cut-out portion 43. Thus, the lead wire 5 is never drawn out from the circuit board 4 while being sharply changed in angle, and accordingly, bending of the lead wire 5 can be suppressed.

As shown in FIG. 5, four soldering parts 51 (51A, 51B, 51C, 51D) are provided on the top surface of the circuit board 4. On each of the soldering parts 51, four soldering regions are provided. The number of soldering regions is related to a fan motor 6 being driven by a three-phase driving system. Specifically, four kinds of windings are drawn out from the fan motor 6, for U-phase, for V-phase, for W-phase, and for common-phase, and thus, each of the soldering parts 51 has four soldering regions. The four soldering parts 51 (51A, 51B, 51C, 51D) correspond to four fan motors 6 (6A, 6B, 6C, 6D).

As shown in FIG. 3 and FIG. 4, the rear wall 22 includes the plurality of support walls 221 (2211, 2212) that support the lead wire 5. The plurality of support walls 221 (2211, 2212) are provided through a concave part 223. That is, the concave part 223 concaved downwardly in the vertical direction is provided between the plurality of support walls 221 (2211, 2212). The plurality of support walls 221 (2211, 2212) are respectively provided with lead-wire fixing grooves 222 (2221, 2222) each notched downwardly in the vertical direction. Thereby, it is suppressed that the lead wire 5 moves in a direction D3 perpendicular to the depth direction of the support walls 221. Also, a ring member 52 may be attached to the lead wire 5 such that the ring member 52 is accommodated in the concave part 223. Thereby, it is suppressed that the lead wire 5 moves in a depth direction D4 of the support walls 221.

Thus, with provision of the plurality of support walls 221 having the lead-wire fixing grooves 222, through the concave part 223, even when a stress is caused to the lead wire 5 by an impact, etc. from the outside, it is suppressed that the lead wire 5 is moved. Thereby, it is less likely that a stress is applied to a region where the lead wire 5 is drawn out and a region where the lead wire 5 and the circuit board 4 contact each other, of the boarder surface of the sealing member 3, coming into contact with air. That is, it is suppressed that a gap is created between the lead wire 5 and the circuit board 4 and water intrudes into the casing 2 through the gap, and at the same time it is easy to maintain good electrical connection of the lead wire 5 and the circuit board 4. Thus, the product reliability can be enhanced, together with the waterproofing function. The numbers of the support walls and the lead-wire fixing walls are not each limited to two, and may be one, or three or more.

Further, an excess potting material of the sealing member 3 is accommodated in the concave part 223, and thereby it can be prevented that the excess potting material of the sealing member 3 leaks from the circuit board accommodation part. As described above, in the molding process of the sealing member 3, in a state that the casing 2 is inclined such that the inclination angle of the first inclined surface 31 is at a predetermined inclination angle, the potting material is poured into the circuit board accommodation part to the extent that the connection portion of the lead wire 5 and the circuit board 4 is covered. At this time, when an excess potting material of the sealing member 3 is poured into the circuit board accommodation part, the excess potting material leaks to the side of the lead wire 5. With provision of the concave part 223, the excess potting material is accommodated in the concave part 223, and thereby it can be prevented that the excess potting material of the sealing member 3 leaks from the circuit board accommodation part.

As indicated by an arrow D2 in FIG. 3, the plurality of support walls 221 (2211, 2212) extend in a direction nearer the direction perpendicular to the direction in which the pair of side walls 23 (231, 232) face each other. Further, as shown in FIG. 7, the plurality of support walls 221 (2211, 2212) are provided on the side of the side wall 232 that is different from the side wall 231 in which a lead-wire drawing out groove 233 for drawing out the lead wire 5 from the casing 2 is provided. Thereby, the lead wire 5 will never be drawn out from the casing 2 while being sharply changed in an angle, and thus bending of the lead wire 5 can be suppressed.

Next, description is made with respect to the fan motor 6. In the present embodiment, four fan motors 6 (6A, 6B, 6C, 6D) are mounted in the casing 2. Each fan motor 6 includes a rotation part having a plurality of blades, and a stationary portion having an armature that is a drive source of the rotation part and a drive board. The armature includes a core in which thin plate-like magnetic steel sheets are layered, and a plurality of coils. Windings drawn out from the plurality of coils are drawn out of the fan motor 6 through the drive board, and are soldered to the above-described four soldering parts 51 (51A, 51B, 51C, 51D).

In the present embodiment, the sealing member is formed of a resin material of silicon series. The resin material of silicon series consists primarily of water-repellent silicon resin. With use of a resin material of silicon series, a higher water-repellent effect is obtained than when using other resin materials, and intruded water can be guided more effectively to the groove 211, and thus, a waterproofing effect can be exerted.

In another embodiment, a sealing member may include a second sealing member on the upper side of the sealing member. The second sealing member is formed of a resin material of fluorine series. That is, a sealing member is constituted of two layers of a first sealing member covering a circuit board and a second sealing member covering a surface of the first sealing member. The resin material of fluorine series is superior in the water-repellent effect against water and oil, compared with a resin material of silicon series. A sealing member may be formed of a resin material of fluorine series only. The electric machine according to the present invention can be used in an outdoor environment, and can be possibly exposed not only to water but also to oil. Accordingly, with the use of a resin material of fluorine series that has a water-repellent effect against water and oil, the electric machine will have a higher waterproofing and oil-proofing effect.

Respective elements appeared in the above-described embodiments may be appropriately combined within the scope not causing a contradiction.

The present invention may be used in electric machines that are installed in an apparatus used outdoors, such a communication base station for mobile-phones, wireless LANs, etc.

While preferred embodiments of the present invention have been described above, it is to be understood that variations and modifications will be apparent to those skilled in the art without departing from the scope and spirit of the present invention. The scope of the present invention, therefore, is to be understood solely by the following claims.

What is claimed is:

1. An electric machine with a casing, comprising:
   a circuit board arranged inside the casing and on which an electronic component is mounted; and
   a sealing member that covers the circuit board, wherein
   the sealing member includes, at least at a part of a boundary surface thereof coming into contact with air, a first inclined surface inclined downwardly in a vertical direction,
   the casing includes a front wall that covers a side of the sealing member on a downward side of the first inclined surface of the boundary surface, a rear wall that covers a side of the sealing member on an upward side of the first inclined surface of the boundary surface, and a pair of side walls that cover sides of the sealing member in a direction perpendicular to a direction in which the first inclined surface of the boundary surface is inclined,
   the front wall has a groove concaved from an upper side to a lower side in the vertical direction, and
   the first inclined surface is inclined toward the groove.

2. The electric machine according to claim 1, wherein
   the pair of side walls extend in parallel to each other, or such that a distance between the pair of side walls becomes narrower toward the front wall, and
   the front wall includes a guide wall directed from at least one side wall of the pair of side walls to the groove.

3. The electric machine according to claim 1, wherein
   the pair of side walls extend in parallel to each other, or such that a distance between the pair of side walls becomes narrower toward the front wall, and
   the front wall includes guide walls directed from respective side walls of the pair of side walls to the groove.

4. The electric machine according to claim 1, wherein
   the sealing member includes, at a part of the boundary surface on a side of the front wall more than the first inclined surface, a second inclined surface inclined upwardly in the vertical direction.

5. The electric machine according to claim 1, wherein
   the electronic component includes a plurality of electronic components,
   an electronic component of the plurality of electronic components that is thinner than the circuit board in the vertical direction is mounted on an upper surface of the circuit board.

6. The electric machine according to claim 1, wherein
   the electronic component includes a plurality of electronic components,
   an electronic component of the plurality of electronic components that is thicker than the circuit board is mounted on an under surface of the circuit board.

7. The electric machine according to claim 1, wherein
   the electronic component includes a plurality of electronic components,
   an electronic component of the plurality of electronic components that is relatively thin in the vertical direction is mounted on a part of the circuit board on a side of the rear wall.

8. The electric machine according to claim 1, wherein
   the circuit board includes a through-hole penetrating through the circuit board in the vertical direction,
   the casing includes a bottom surface portion covering a lower side of the circuit board in the vertical direction,
   the bottom surface portion includes a cylindrical part extending upward in the vertical direction, and
   the circuit board is fixed to the cylindrical part by a screw passing through the through-hole and the cylindrical part.

9. The electric machine according to claim 8, wherein
   a height of the cylindrical part in the vertical direction is ¼ or greater and smaller than ¾ of a height of the casing in the vertical direction.

10. The electric machine according to claim 1, wherein
    the circuit board includes a lead wire that electrically connects to another electric machine,
    a connection portion of the lead wire and the circuit board is covered by the sealing member,
    the rear wall includes a support wall that supports the lead wire, and
    the support wall includes a lead-wire fixing groove into which the lead wire is fit.

11. The electric machine according to claim 10, wherein
    the lead wire is connected to the under surface of the circuit board.

12. The electric machine according to claim 10, wherein
    the support wall includes a plurality of support walls, and
    a concave part concaved in the vertical direction is provided between the plurality of support walls.

13. The electric machine according to claim 10, wherein
    the support wall includes a plurality of support walls,
    the plurality of support walls extend in a direction nearer a direction perpendicular to a direction in which the pair of side walls face each other, and
    the plurality of support walls are provided on a side of one side wall of the pair of side walls that is different from the other side wall of the pair of side walls in which a lead-wire drawing out groove for drawing out the lead wire from the casing is provided.

14. The electric machine according to claim 10, wherein
    the support wall includes a plurality of support walls,
    the circuit board includes a cut-out portion formed by cutting-out a region adjacent to the plurality of support walls, and
    the lead wire is drawn out from the circuit board through the cut-out portion.

15. The electric machine according to claim 1, wherein
    the sealing member is formed of a resin material of silicon series.

16. The electric machine according to claim 1, wherein
    the sealing member is comprised of a first sealing member and a second sealing member, the first sealing member covering the circuit board, and the second sealing member formed on an upper side of the first sealing member in the vertical direction, with an upper surface thereof serving as the boundary surface of the sealing member, and the second sealing member is formed of a resin material of fluorine series.

\* \* \* \* \*